United States Patent
Tanaka et al.

[19]

[11] Patent Number: 6,021,281
[45] Date of Patent: Feb. 1, 2000

[54] APPARATUS AND METHOD FOR RECORDING INFORMATION ON A FILM

[75] Inventors: Yoshiharu Tanaka, Kawachinagano; Junichi Tanii, Izumi, both of Japan

[73] Assignee: Minolta Co., Ltd., Osaka, Japan

[21] Appl. No.: 09/064,394

[22] Filed: Apr. 22, 1998

[30] Foreign Application Priority Data

Apr. 30, 1997 [JP] Japan .................................. 9-112680

[51] Int. Cl.⁷ .......................... G03B 17/24; G11B 5/09
[52] U.S. Cl. ........................ 396/319; 360/8; 360/24; 360/43
[58] Field of Search .................... 396/310, 319, 396/387, 395, 396, 397, 406; 360/1, 3, 8, 18, 20, 24, 29, 30, 43, 48, 55

[56] References Cited

U.S. PATENT DOCUMENTS

| 5,502,527 | 3/1996 | Kazami et al. .................. 396/319 |
| 5,724,623 | 3/1998 | Tamamura ....................... 396/319 |
| 5,745,812 | 4/1998 | Taillie .......................... 396/319 |

FOREIGN PATENT DOCUMENTS

4-366935  12/1992  Japan .

*Primary Examiner*—Safet Metjahic
*Assistant Examiner*—J. K. Han
*Attorney, Agent, or Firm*—Sidley & Austin

[57] ABSTRACT

A recording device for recording film information concerning photography made to each of a plurality of exposure areas on respective recordable areas corresponding to the plurality of exposure areas, includes: a film feeder which feeds the film; a recording head which records a film information signal on a corresponding recordable area, the signal having a specified frequency; and a frequency controller which changes the signal frequency during the time when the film information is being recorded on the recordable area. The recording device makes it possible to simplify the construction of a camera, and to record film information with high density and stability.

21 Claims, 8 Drawing Sheets

APPARATUS AND METHOD FOR RECORDING INFORMATION ON A FILM

BACKGROUND OF THE INVENTION

This invention relates to a film information recording device for rolled film which is formed with a plurality of exposure areas and a plurality of information recordable areas corresponding to the exposure areas along the longitudinal direction thereof and in which information concerning photography made to each frame is recordable in a corresponding magnetic recordable area.

Figure 13:
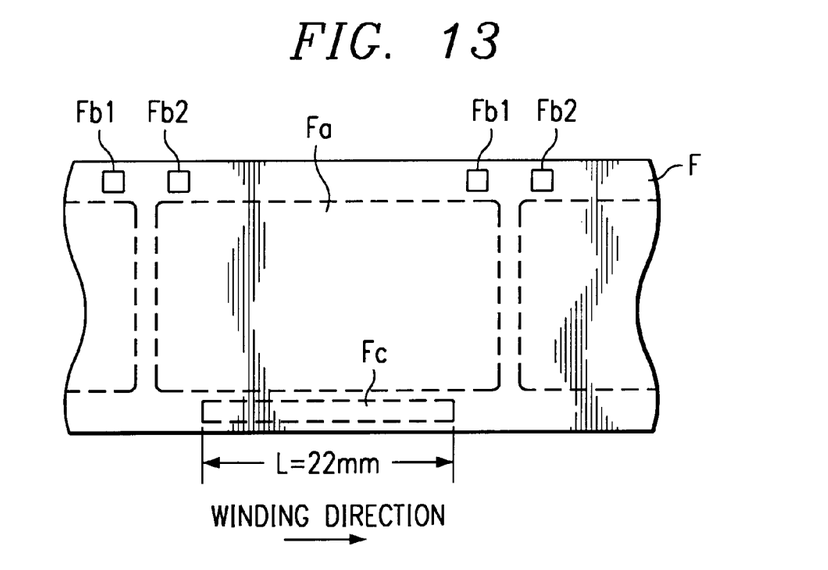
FIG. 13 is a diagram showing a construction of a film.

A novel photosystem such as APS (advanced photosystem) adopts a rolled film in which information (hereinafter, "film information") such as a date of photographing and a print size is magnetically recordable for each frame. The film information is recordable in a strip-shaped magnetic recordable area Fc provided along a longer side of a laterally long exposure area Fa of each frame of a rolled film F as shown in FIG. 13.

Figure 14:
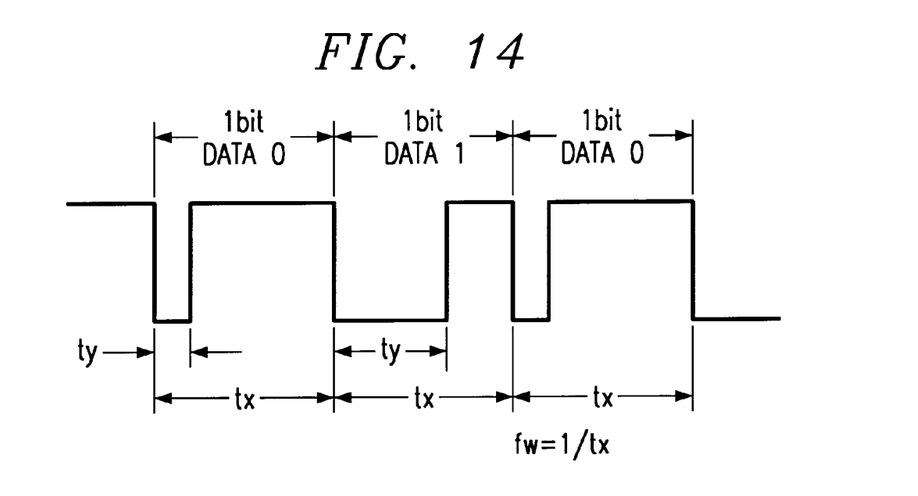
FIG. 14 is a chart showing the waveform of a signal representing film information recorded in a magnetic recordable area.

According to the novel photosystem, a size L (area length) of the magnetic recordable area is standardized: L=22 mm. This area length L is about two thirds of the length of the longer side of the exposure area Fa. The film information includes a binary data of a specified number of digits, and a bit data "0" or "1" constituting the binary data is magnetically written in the magnetic recordable area Fc by being modulated into a pulse train signal shown in FIG. 14. The pulse train signal shown in FIG. 14 is obtained by allotting two kinds of pulse signals having different duty ratios Du (ty/tx) to the data "0" and "1" and aligning them in time series. In FIG. 14, the pulse signal of Du<50% is allotted to "0" and the pulse signal of Du>50% is allotted to "1".

Further according to the novel photosystem, a recording density Bb (a spatial magnetic displacement per pulse signal) of film information written in the magnetic recordable area Fc and a variation width ΔBb of the recording density Bb are also standardized.

Since the recording density Bb is determined based on a feed speed vw of the film F during the writing of film information and a write frequency fw (i.e., duration tx of the pulse signal) of the magnetic signal, the feed speed vw, the write frequency fw and a write start timing of film information need to be controlled so as to satisfy the standards of the recording density Bb and its variation width ΔBb in the camera in accordance with the novel photosystem.

Preferably, it is desirable to start the writing of film information at a moment when a magnetic head reaches the leading end position of the magnetic recordable area Fc and to write the magnetic signal at a constant feed speed vw.

However, since the film information is generally written during the feed of a frame (one frame winding) performed after photography is made to each frame, it is very difficult to feed the film F at a fixed high speed and to precisely start the writing of film information from the leading end position of the magnetic recordable area Fc.

In commercially available cameras in accordance with the novel photosystem, a revolving speed n of a motor as a drive source of the film F during the film winding is detected and the write frequency fw of the magnetic signal during the writing of film information is changed according to this revolving speed n in order to stabilize the film information recorded in the magnetic recordable area Fc.

There are other commercially available cameras in accordance with the novel photosystem in which the variation of the film feed speed vw is reduced by increasing the reduction gear ratio of a torque transmission member for transmitting a torque of a motor to a take-up spool for the film F and reducing the revolving speed of the spool when the film F is wound, thereby suppressing the variation width ΔBb of the recording density Bb.

Further, in order to stabilize the write start timing of film information, perforations Fb1, Fb2 are formed at the front and rear ends of each exposure area Fa of the film F as shown in FIG. 13, and the positions of the exposure areas Fa and the magnetic recording Fc along longitudinal direction are specified based on the edges of the perforations Fb1, Fb2. Accordingly, the write start timing of film information is generally controlled using a detection signal of the perforation Fb1 in the conventional cameras in accordance with the novel photosystem.

Specifically, in a camera provided with a single optical sensor including a photoreflector for detecting the perforations Fb1, Fb2, the optical sensor is provided in a position of a picture frame toward a film winding chamber (downstream from the film during the film winding) and between the perforation Fb1 of a frame to be exposed in an exposure position and the perforation Fb2 of the previous frame. Upon the start of the film feed, the write start timing of film information in the magnetic recordable area Fc corresponding to the frame to be exposed is controlled in accordance with the detection signal of the perforation Fb1 at the front end of the frame to be exposed which is obtained by the optical sensor. The exposure area Fa of the next frame is controllably stopped in the exposure position (specified position corresponding to the picture frame of the camera) by a detection signal of the perforation Fb2 at the rear end of the frame to be exposed.

The method for changing the write frequency fw of the magnetic signal during the writing of film information according to the revolving speed n of the drive motor for the film F which is adopted in the conventional cameras necessitates a detector for detecting the revolving speed n of the motor as a drive source of the film F and is disadvantageous to the demand for making the cameras smaller and more inexpensive. There may be considered a method for detecting the actual feed speed vw of the film F instead of the revolving speed n of the drive motor. Such a method also necessitates a detector and is accordingly disadvantageous to the demand for making the cameras smaller and more inexpensive.

The method for reducing the revolving speed of the take-up spool stabilizes the winding speed fast since a load at the start of the feed is low. However, this method requires a longer time for the feed of the frame to write the film information, thereby considerably reducing the response performance at the time of continuous photographing and arises a problem in the operability of the camera. In view of this disadvantage, there may be considered a method for controlling the write start timing of film information such that the film information is recorded in an area where the feed speed vw of the film F varies to a smaller extent without considerably reducing the winding speed of the film F. However, according to this method, a recording start position of film information in the magnetic recordable area Fc varies due to a variation of the write start timing of film information from the start of the feed of the film F. If the write start timing is delayed too much, there arises another problem that the film information may not be completely written in the magnetic recordable area Fc.

The conventional method for stabilizing the write start timing of film information is effective for this problem.

However, if this method is adopted, it is necessary to balance the stabilization of the write start timing in connection with a feed speed control of the film F so that the feed speed vw of the film F is increased to or above a specified speed at which the film information is recordable at least when the magnetic head passes the front end of the magnetic recordable area Fc. This results in a complicated feed control of the film F during the winding of the film F.

Further, the conventional method for stabilizing the write start timing of film information necessitates a special optical sensor for controlling the write start timing of film information and is accordingly disadvantageous in making cameras smaller and more inexpensive.

SUMMARY OF THE INVENTION

It is an object of the present invention to provide a film information recording device and method which have overcome the problems residing in the prior art.

According to an aspect of the present invention, a recording device for recording film information on respective recordable areas corresponding to a plurality of exposure areas of a film, film information concerning photography made to each exposure area, the recording device comprises: a film feeder which feeds the film by one exposure area; a recording member which records film information on a corresponding recordable area in the form of a signal having a specified frequency; and a frequency controller which changes the signal frequency during the time when the film information is being recorded on the recordable area.

According to another aspect of the present invention, a recording device for recording film information on respective recordable areas corresponding to a plurality of exposure areas of a film, film information concerning photography made to each exposure area, the recording device comprises: a film feeder which feeds the film by one exposure area; a recording signal generator which generates a recording signal based on a given film information, the recording signal being generated by modulating a pulse train signal having a frequency in accordance with the given film information; a recording member which records the generated recording signal on a recordable area corresponding to the given film information while the film being fed; and a frequency changer which changes the frequency of the generated recording signal at least once during the time when the recording signal is being recorded.

According to still another aspect of the present invention, a method for recording film information on respective recordable areas corresponding to a plurality of exposure areas of a film, film information concerning photography made to each exposure area, the method comprises the steps of: feeding the film; recording a signal on a first portion of the recordable area at a first frequency; changing the recording frequency from the first frequency to a second frequency after the recording on the first portion is completed; and recording the signal on a second portion of the recordable area at a second frequency.

These and other objects, features and advantages of the present invention will become more apparent upon a reading of the following detailed description and accompanying drawings.

BRIEF DESCRIPTION OF THE DRAWINGS

FIGS. 6($a$)–6($c$) are graphs showing characteristics over time of a film feed speed during one frame winding, a write frequency of film information and a recording density of film information recorded in the magnetic recordable area;

FIGS. 11($a$)–11($c$) are graphs showing characteristics over time of the film feed speed during one frame winding, the write frequency of film information and the recording density of film information recorded in the magnetic recordable area when a supply voltage is high;

FIGS. 12($a$)–12($c$) are graphs showing characteristics over time of the film feed speed during one frame winding, the write frequency of film information and the recording density of film information recorded in the magnetic recordable area when the supply voltage is low;

DETAILED DESCRIPTION OF THE PREFERRED EMBODIMENTS OF THE INVENTION

Figure 1:
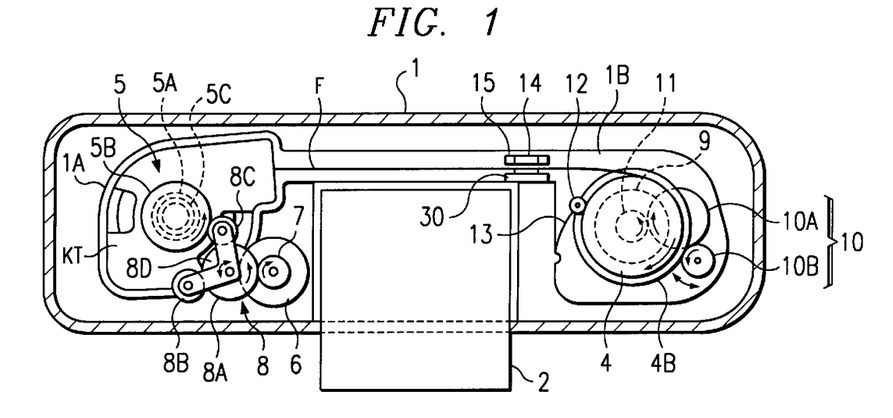
FIG. 1 is a schematic plan diagram showing a construction for film feed and magnetic recording in a camera provided with a film information recording device embodying the present invention.
Figure 2:
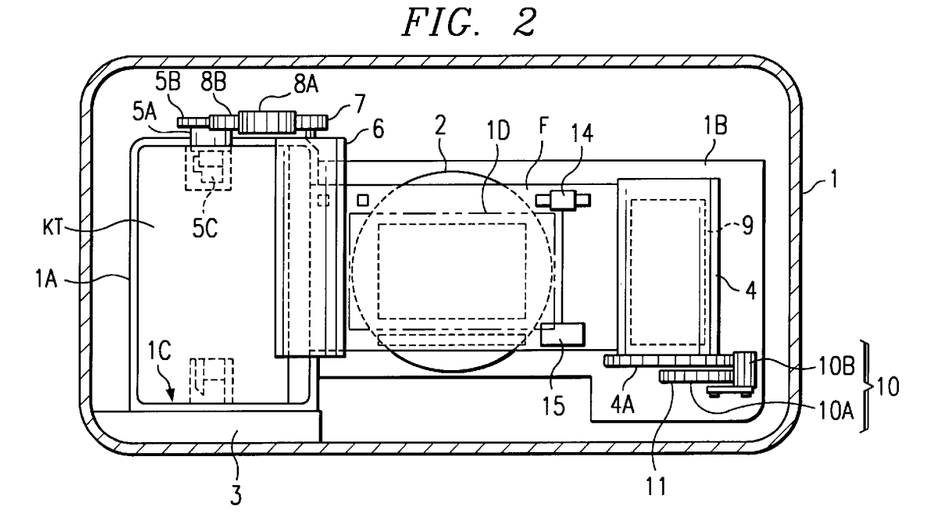
FIG. 2 is a schematic front diagram showing the construction for film feed and magnetic recording of the camera.
Figure 3:
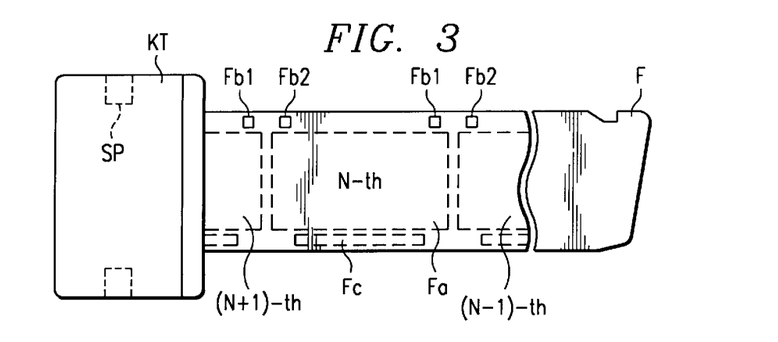
FIG. 3 is a diagram showing a film dispensed from a film cartridge.

FIGS. 1 and 2 are schematic plan and front diagrams showing a construction for film feed and magnetic recording of a camera provided with a film information recording device embodying the invention. FIG. 3 is a diagram showing a film dispensed from a film cartridge.

In a camera 1, when viewed from the front side of camera, a cartridge chamber 1A in which a film cartridge KT is to be mounted is provided at the left side of a taking lens 2 and a film take-up chamber 1B for taking up a film F dispensed from the film cartridge KT is provided at the right side of the taking lens 2.

The cartridge chamber 1A is provided with a cartridge mount opening 1C formed in the bottom surface of the camera 1. This cartridge mount opening 1C is closable by a lid 3 openably provided at the bottom surface of the camera 1.

The cartridge chamber 1A has an inner configuration substantially identical to the outer configuration of the film cartridge KT. A fork 5 to be fitted into a spool SP of the loaded film cartridge KT is rotatably provided in a substantially center position of the upper wall (wall opposite to the cartridge mount opening 1C) of the cartridge chamber 1A. The fork 5 is such that a fork gear 5B is integrally formed at a base end of a fork shaft 5A. A fork key 5C having a diameter smaller than that of the fork gear 5B is mounted at a leading end of the fork shaft 5A such that it is movable along axial direction and biased toward the leading end of the fork shaft 5A. The fork 5 is mounted outside the upper wall of the cartridge chamber 1A with the fork key 5C inserted into the cartridge chamber 1A.

Between the cartridge chamber 1A and the taking lens 2 is provided a motor 6 as a driving source of the fork 5 along the side wall of the cartridge chamber 1A. A torque transmitting member 8 for transmitting a torque of the motor 6 to the fork gear 5B is provided between a drive gear 7 secured to the leading end of a rotor of the motor 6 and the fork gear 5B.

The torque transmitting member 8 includes a planetary gear device including a sun gear 8A and two planetary gears 8B, 8C. The planetary gear 8B is a gear for transmitting a torque of the motor 6 to the fork gear 5B in such a direction as to dispense the film F from the cartridge KT, and a planetary gear 8C is a gear for transmitting the torque of the motor 6 in such a direction as to rewind the film F into the cartridge KT. A V-shaped carrier 8D having a specified opening angle is rotatably mounted on the shaft of the sun gear 8A. At the leading ends of this carrier 8D are rotatably mounted the planetary gear 8B (hereinafter, "thrust planetary gear 8B") and the planetary gear 8C (hereinafter, "rewind planetary gear 8C") which are both engaged with the sun gear 8A (see FIG. 1). Further, the sun gear 8A is engaged with the drive gear 7 of the motor 6.

In FIG. 1, if the motor 6 is so driven as to rotate the drive gear 7 clockwise (hereinafter, drive in this direction is referred to as "forward drive"), the sun gear 8A is rotated counterclockwise and the thrust and rewind planetary gears 8B, 8C move counterclockwise along the outer surface of the sun gear 8A and consequently only the rewind planetary gear 8C is coupled with the fork gear 5B. Accordingly, the torque of the motor 6 is transmitted to the fork gear 5B via the sun gear 8A and the rewind planetary gear 8C, and the fork gear 5B is rotated counterclockwise, thereby rewinding the film F into the cartridge chamber 1A (see the state of FIG. 1).

On the other hand, if the motor 6 is so driven as to rotate the drive gear 7 counterclockwise (hereinafter, drive in this direction is referred to as "reverse drive"), the sun gear 8A is rotated clockwise and the thrust and rewind planetary gears 8B, 8C move clockwise along the outer surface of the sun gear 8A, and consequently only the thrust planetary gear 8B is coupled with the fork gear 5B. Accordingly, the torque of the motor 6 is transmitted to the fork gear 5B via the sun gear 8A and the thrust planetary gear 8B, and the fork gear 5B is rotated clockwise, thereby dispensing the film F from the cartridge chamber 1A.

A take-up spool 4 for taking up the film F is rotatably provided in the film take-up chamber 1B. The take-up spool 4 is made of a cylindrical member and a spool gear 4A is formed on the outer surface of its bottom end. An unillustrated friction member is provided on the outer surface of the take-up spool 4, and a roller 12 is in pressing contact with the outer surface of the take-up spool 4 in a specified position. The roller 12 is rotatably supported on the leading end of a strip-shaped spring member 13 made of an elastic member of phosphor bronze which has one end thereof secured to an unillustrated housing. This roller 12 nips the leading end of the film F dispensed from the film cartridge KT in association with the outer surface of the take-up spool 4 during the loading of the film F, and winds the film F around the take-up spool 4.

Inside the take-up spool 4 is provided a motor 9 as a drive source of the take-up spool 4. A torque transmitting member 10 for transmitting a torque of the motor 9 to the spool gear 4A is provided at the bottom part of the take-up spool 4. The torque transmitting member 10 includes a planetary gear device provided with the sun gear 10A and a single planetary gear 10B. The sun gear 10A is engaged with a drive gear 11 secured to the leading end of a rotor of the motor 9.

In FIG. 1, if the motor 9 is so driven as to rotate the drive gear 11 counterclockwise (hereinafter, drive in this direction is referred to as "reverse drive"), the sun gear 10A is rotated clockwise and the planetary gear 10B moves clockwise along the outer surface of the sun gear 10A to be coupled with the spool gear 4A. Accordingly, the torque of the motor 9 is transmitted to the spool gear 4A via the sun gear 10A and the planetary gear 10B, and the spool gear 4A is rotated clockwise to take up the film F (see the state of FIG. 1).

On the other hand, if the motor 9 is so driven as to rotate the drive gear 11 clockwise (hereinafter, drive in this direction is referred to as "forward drive"), the sun gear 10B is rotated counterclockwise and the planetary gear 10B moves counterclockwise along the outer surface of the sun gear 10A to be disengaged from the spool gear 4A.

An optical sensor 14 including a photoreflector for detecting perforations Fb1, Fb2 of the film F is provided between an exposure window iD formed behind the taking lens 2 of the camera 1 and the take-up spool 4 and on a moving path of the perforations Fb1, Fb2 during the feed of the film F. Further, a magnetic head 15 for recording film information is provided between the exposure window ID and the take-up spool 4 and on a moving path of a magnetic recordable areas Fc of the film F during the feed of the film F. Further, a pad 30 for pressing the film F against the magnetic head 15 is provided in a position opposite to the magnetic head 15. This pad 30 is biased toward the magnetic head 15 by an unillustrated biasing member such as a spring.

The photoreflector 14 is, precisely speaking, so arranged as to be positioned between the perforation Fb1 at the front end of the N-th frame and the perforation Fb2 at the rear end of the (N−1)th frame when the center of the exposure area Fa of the N-th frame coincides with that of the exposure window 1D. Further, the magnetic head 15 is provided below the photoreflector 14.

Figure 4:
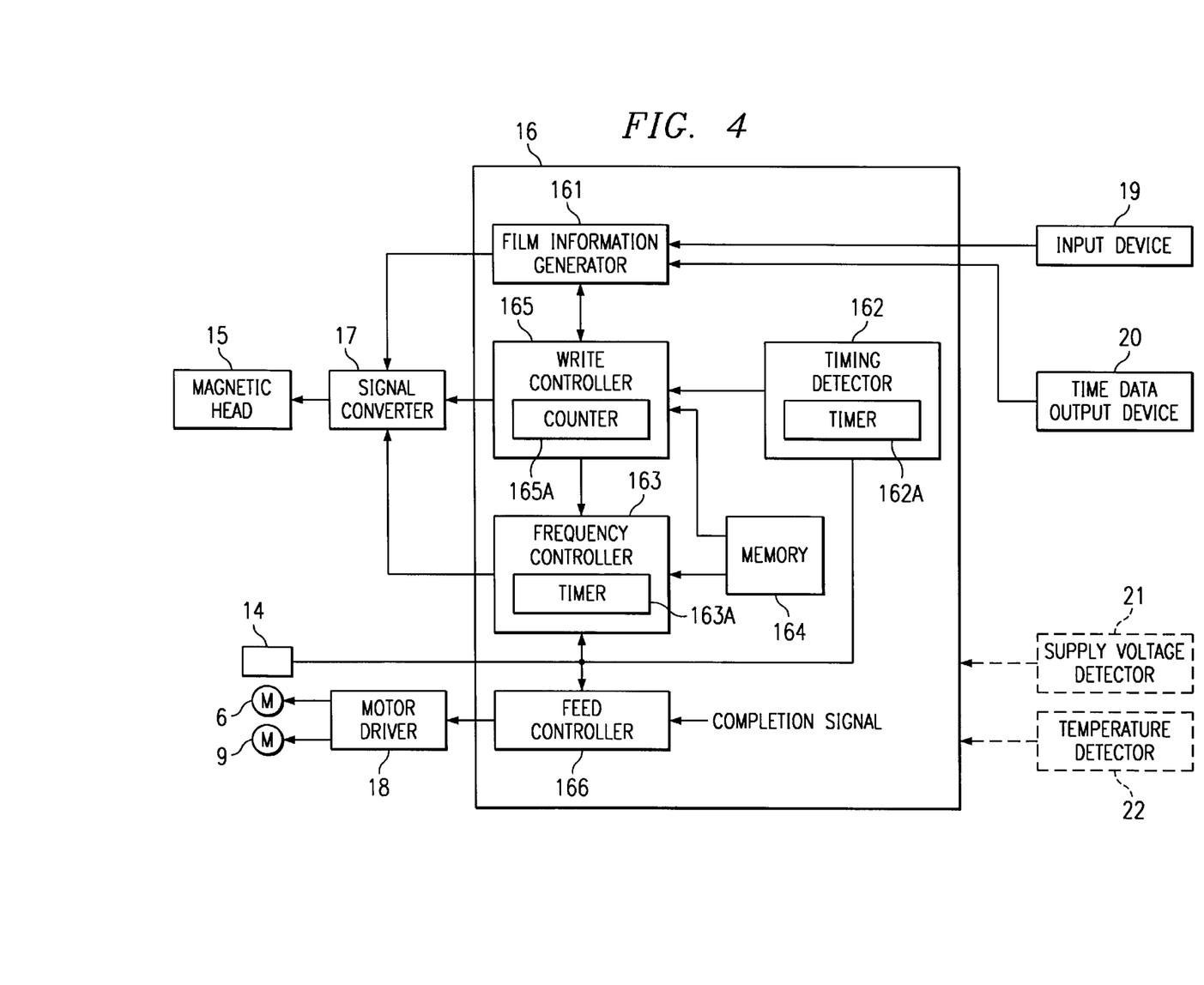
FIG. 4 is a block diagram showing a control system of film information recording device.
Figure 5:
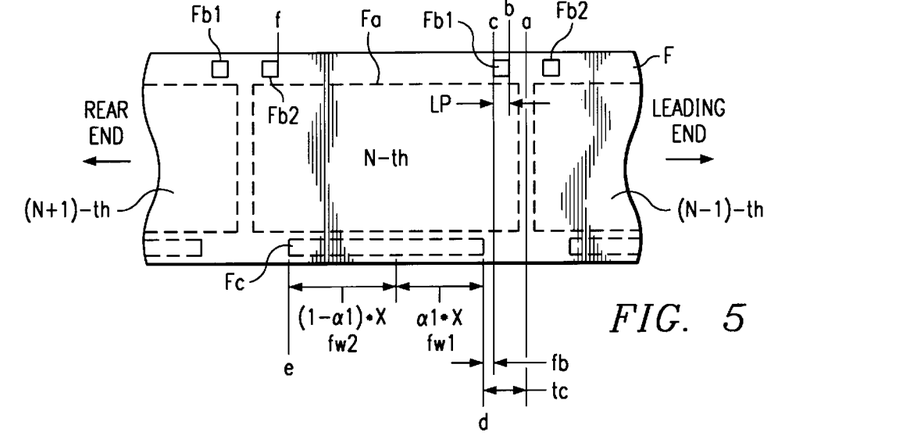
FIG. 5 is a diagram showing an exposure area and a magnetic recordable area of the N-th frame of the film which is used to explain a write timing of a film information.

FIG. 4 is a block diagram of a control system of film information recording device according to the invention, and FIG. 5 is a diagram showing an exposure area and a magnetic recordable area of the N-th frame of the film which is used to explain a write timing of film information.

In FIG. 4, the same elements as those shown in FIGS. 1 to 3 are identified by the same reference numerals. A controller 16 centrally controls the recording of film information in the magnetic recordable area Fc of the film F. With the controller 16 are connected the photoreflector 14, a magnetic signal converter 17, a motor driver 18, an input device 19 and a photographing time data output device 20.

The magnetic signal converter 17 outputs the film information inputted from a film information generator 161, to be described later, to the magnetic head 15 after converting it into a magnetic signal (pulse train signal) of a write frequency fw inputted from a write frequency controller 163. The operation of the magnetic signal converter 17 is controlled by a write controller 165 provided in the controller 16 to be described later. The writing of film information in the film F by the magnetic head 15 is controlled by controllably activating and deactivating the magnetic signal converter 17.

A motor driver 18 controls the drive of the motor 6 for driving the fork 5 and the drive of the motor 9 for driving the spool 4. The motor driver 18 rotates the motor 6 or motor 9 in a specified direction at a specified speed in accordance with a control signal from a film feed controller 166 (to be described later).

The input unit 19 is adapted to input the film information including a print size (L-print/panorama/high vision), a frame title, and a photographed frame (vertically framed/ horizontally framed). The input unit 19 includes input keys provided in a specified position of the main body of the camera 1. A photographer is allowed to input a desired film information by means of these input keys. The photographing time data output unit 20 is provided in an unillustrated data imprinting device for outputting a photographing time as a film information.

The controller 16 includes the film information generator 161, a write timing detector 162, the write frequency controller 163, a memory 164, the write controller 165 and the film feed controller 166.

The film information generator 161 generates the film information to be recorded in the magnetic recordable area Fc of each frame. To the film information generator 161 is inputted the film information from the input unit 19 and the photographing time data from the photographing time data output unit 20. Further, photographing conditions (such as exposure control values and a light source) can be inputted as the film information from an unillustrated controller for the photographing. The film information generator 161 generates a collection of film information (binary data of a total number X of bits) by arraying a plurality of kinds of inputted film information (binary data) in a specified order.

The write timing detector 162 detects a write start timing of film information in the film F during the one frame winding of the film F after the photographing. To the write timing detector 162 is inputted a detection signal of the photoreflector 14. The write timing detector 162 starts a timer 162A upon detecting the rear edge of the perforation Fb1 at the front end of the exposed frame based on a variation of the detection signal of the photoreflector 14, and outputs a write start signal for the film information to the write controller 15 at a timing when the timer 162A stops measuring a predetermined time tb(ms). The write controller 165 activates the magnetic signal converter 17 upon the receipt of this write start signal.

Specifically, in this embodiment, when the film F is wound for the predetermined time tb from a point c corresponding to the rear edge of the perforation Fb1 in FIG. 5, the writing of film information in the corresponding magnetic recordable area Fc is started assuming that at least a point d corresponding to the front end of the magnetic recordable area Fc of the exposed frame (N-th frame) has reached the position opposite to the magnetic head 15.

The write frequency controller 163 controls the write frequency fw of the magnetic signal when the film information is converted into a magnetic signal. Since the camera 1 according to this embodiment is capable of performing one frame winding at a relatively high speed after the completion of the photographing, a feed speed v of the film F during the winding of the film F largely varies from the start (t=0) to the end (t=t6) of the winding, for example, as shown in a feed speed characteristic of FIG. 6. If the write frequency fw of the magnetic signal is fixed to an initial write frequency fw1 as shown in the write frequency characteristic of FIG. 6, a relative scanning distance of the magnetic head 15 in the magnetic recordable area Fc increases as the feed speed v of the film F is increased. Thus, a recording density Bb of film information recorded in the magnetic recordable area Fc largely varies (see a variation width ΔBb2 of FIG. 6).

In view of this, in this embodiment, the write frequency fw of the magnetic signal inputted to the magnetic head 15 is changed at least once during the relative scanning of the magnetic head 15 on the magnetic recordable area Fc, so as to suppress the variation width ΔBb of the recording density Bb of film information recorded in the magnetic recordable area Fc as low as possible even if the variation width of the feed speed v of the film F is large (see a variation width ΔBb1 of FIG. 6).

In the example of FIG. 6, the variation width ΔBb of the recording density Bb is made smaller than ΔBb2 in the case of the fixed write frequency by changing the write frequency fw of the magnetic signal to fw2 (=β1·fw1, β1>1) larger than fw1 during the writing of film information. In FIG. 5, a part α1·X(0α<α1<1) of the total number X of film information is recorded at the write frequency fw1 in a portion α1·X of the magnetic recordable area Fc, whereas the remaining film information (1−α1)·X is recorded at the write frequency fw2 (>fw1) in a portion (1−α1)·X thereof.

The write frequency controller 163 includes a timer 163A, and the detection signal of the photoreflector 14 is inputted thereto. The write frequency controller 163 starts the timer 163A upon detecting the front edge (see point b of FIG. 5) of the perforation Fb1 at the front end of the exposed frame based on the variation of the detection signal of the photoreflector 14. Upon detecting the rear edge (see point c of FIG. 5) of the perforation Fb1, the write frequency controller 163 stops the timer 163A, thereby measuring a time tp during which the film F is fed a distance Lp corresponding to a longitudinal dimension of the perforation Fb1. A feed speed vw1 (=Lp/tp) of the film F immediately before the start of the writing of film information is calculated based on the measured time tp (sec) and the distance Lp (mm), and the initial write frequency fw1 is set based on this calculation result.

The initial write frequency fw1 is determined based on the feed speed vw1 of the film F because the recording density Bb of film information recorded in the magnetic recordable area Fc has a proper range and an absolute value of the recording density Bb is determined based on the feed speed vw1 and the write frequency fw1. Accordingly, as shown in a recording density characteristic of FIG. 6, the initial write frequency fw1 corresponding to the feed speed v of the film F is set such that the recording density Bb of film information lies within a proper range between Bb1 and Bb2.

Since the feed speed vw1 of the film F immediately before the start of the writing of film information which is calculated based on the feed time tp corresponding to the longitudinal dimension Lp of the perforation Fb1 differs from an actual feed speed vw2 at the start of the writing of film information, the initial write frequency fw1 is set in consideration of a variation Δv of the feed speed from the detection of the feed speed to the writing of film information. In other words, the feed speed vw1 is detected based on the feed time tp at time t2 in FIG. 6. The initial write frequency fw corresponding to the feed speed vw2 at time t3 is set by assuming the speed variation Δv to time t3 based on the feed speed vw.

The initial write frequency fw1 is set from the feed speed vw1 of the film F via a conversion table of vw1–fw1 which is set in advance and stored in a memory 164. The initial write frequency fw1 may be calculated from the feed speed vw1 in accordance with an operation expression. The write frequency controller 163 sets the initial write frequency fw1 by reading the initial write frequency fw1 corresponding to the detected speed vw1 from the memory 164, and outputs it to the magnetic signal converter 17.

The write frequency controller 163 also sets a second write frequency fw2 to be changed and successively outputs to the magnetic signal converter 17 at change timings inputted from the write controller 165. The write frequency fw2 is obtained by multiplying the initial write frequency fw1 by a predetermined factor β1 (>1). This factor β1 is also stored in the memory 164.

Upon the receipt of the write frequency (=β1·fw1) from the write frequency controller 163, the magnetic signal converter 17 changes the write frequency of the magnetic signal to the write frequency fw2 and outputs the resulting magnetic signal to the magnetic head 15.

The write controller 165 controls timings at which the magnetic head 15 starts and stops writing the film information in the magnetic recordable area Fc of the film F and controls a change timing of the write frequency. The write controller 165 counts the bit number of a binary data representing the film information simultaneously with the start of the writing of film information, changes the write frequency fw from fw1 to fw2 when the film information of a specified big number X1 (=α1·X) is written in the magnetic recordable area Fc, and stops the writing of film information when the film information of a total bit number X is written in the magnetic recordable area Fc.

It should be noted that X is a total bit number of film information and α1 is a factor of 0<α1<1. The factor α1 is prestored in the memory 164. Further, the write controller 165 has a counter 165A for counting the bit number X.

The film feed controller 166 controls the feed of the film F. Upon the receipt of a photographing completion signal from an unillustrated exposure control member, the film feed controller 166 drives the motor 9 via the motor driver 18 in the reverse direction to start the one frame winding of the film F. To the film feed controller 166 is inputted the detection signal of the photoreflector 14. Upon detecting the edge (see point f of FIG. 5) of the perforation Fb2 at the rear end of the exposed frame based on the variation of the detection signal of the photoreflector 14, the film feed controller 166 stops the motor 9 via the motor driver 18. Accordingly, the film F stops after a predetermined time (after a braking time) following the stop of the driving of the motor 9, and the exposure area Fa of the next frame is set in a specified exposure position.

Next, the film information write control of film information recording device will be described with reference to FIGS. 5 to 8.

Figure 6A:
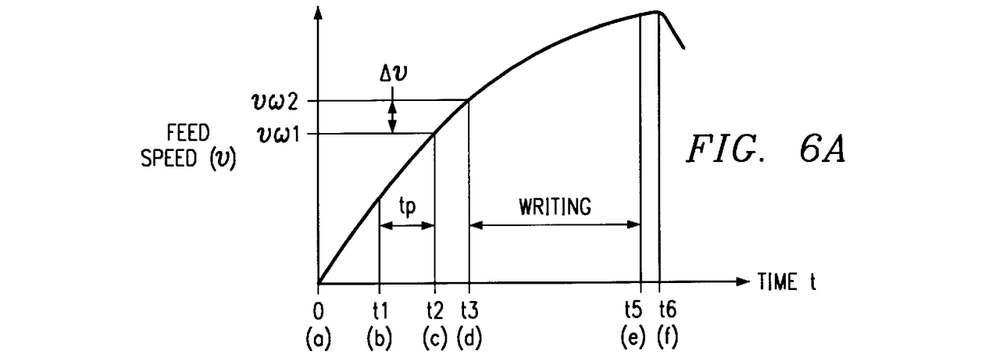
Figure 6B:
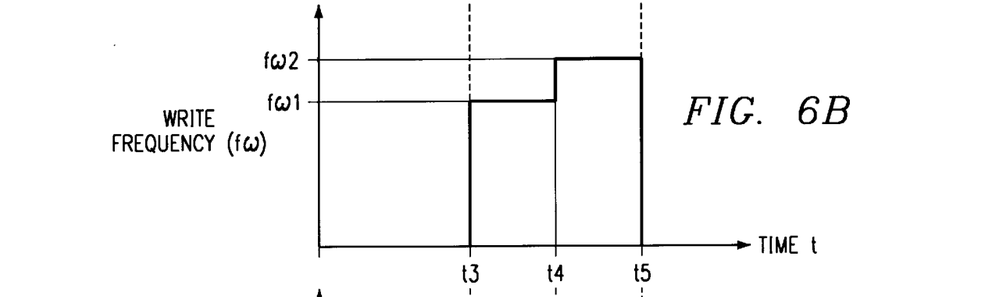
Figure 6C:
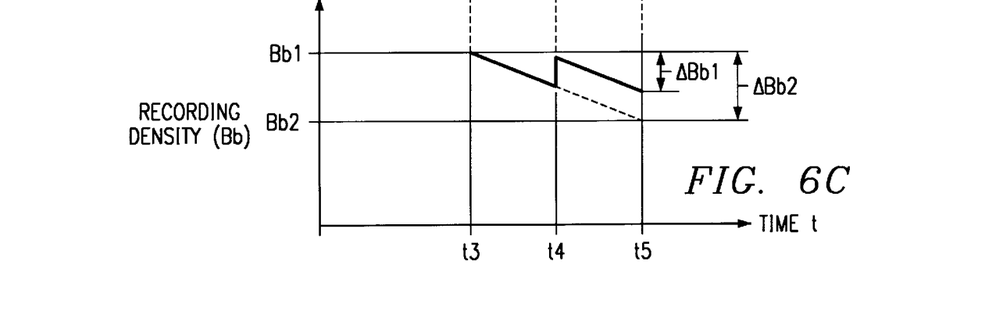
Figure 7:
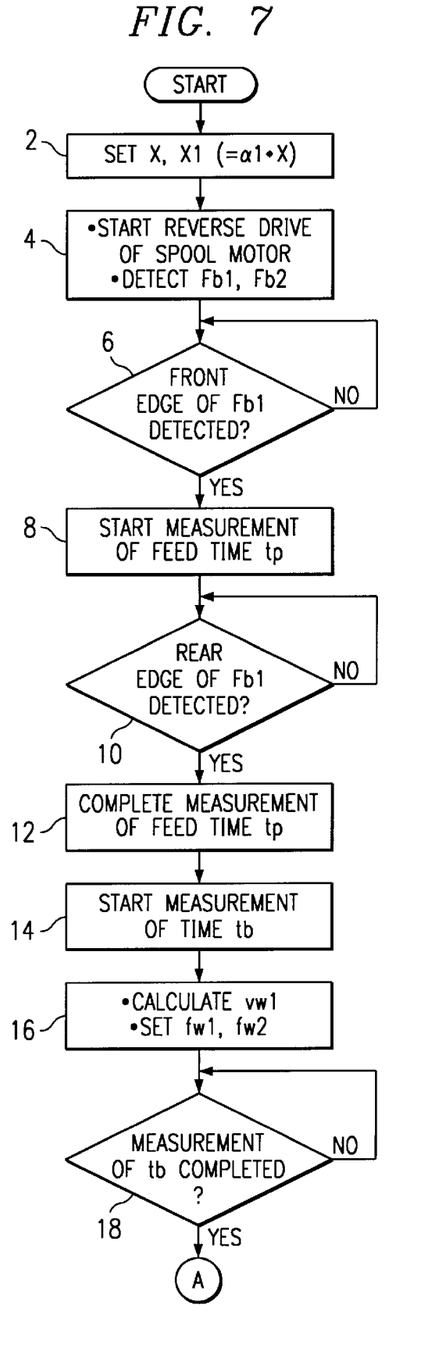
FIGS. 7 and 8 are a flowchart showing a first operation sequence of write control of film information.
Figure 8:
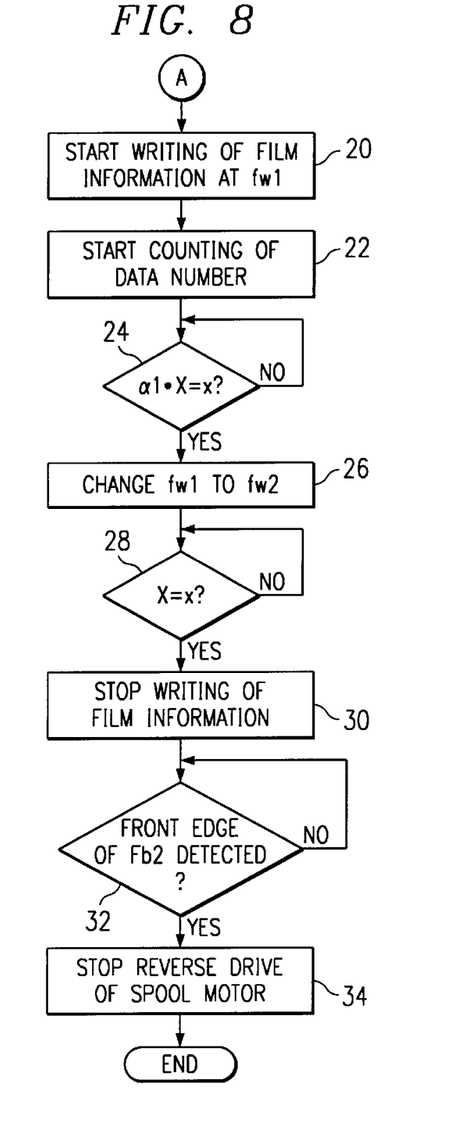

FIGS. 6(a)–6(c) are graphs showing characteristics over time of a film feed speed during one frame winding, a write frequency of film information, and a recording density of film information recorded in the magnetic recordable area, respectively. FIGS. 7 and 8 are a flowchart showing a first operation sequence of film information write control.

The flowchart of FIGS. 7 and 8 shows a write control executed when the film information corresponding to the image recorded in the N-th frame is recorded in the magnetic recordable area Fc of the N-th frame while the film F is wound so that the exposure area Fa of the (N+1)th frame reaches the specified exposure position facing the exposure window 1D upon the completion of the exposure to the N-th frame.

When the exposure area Fc of the N-th frame is fed to the exposure position, the thrust planetary gear 8B and the rewind planetary gear 8C of the torque transmitting member 8 are disengaged from the fork gear 5B, bringing the fork gear 5B into its idly rotatable state. On the other hand, the planetary gear 10B of the torque transmitting member 10 is engaged with the drive gear 11 of the motor 9, thereby bringing the film F into its state where it can be wound.

Upon the completion of the exposure to the N-th frame, the data number X of film information corresponding to this exposed frame and the data number X1=α1·X (α1: factor, 0<α1<1) of the film data to be written at the initial write frequency fw1 are set write controller 165 (Step #2).

Subsequently, the motor 9 for the take-up spool 4 is driven in the reverse direction to start the winding of the film F and the detection of the perforation Fb1 at the front end of the exposure area Fa of the N-th frame by the photoreflector 14 is started (Step #4).

When the front edge (see point b of FIG. 5) of the perforation Fb1 is detected from the first change in the detection signal of the photoreflector 14 (YES in Step #6, see time t1 of FIG. 6), the measurement of the feed time tp of the film F corresponding to the longitudinal length of the perforation Fb1 is started in the write frequency controller 163 (Step #8). When the rear edge (see point c of FIG. 5) of the perforation Fb1 is detected from the second change in the detection signal of the photoreflector 14 (YES in Step #10, see time t2 of FIG. 6), the measurement of the feed time tp of the film F is completed (Step #12). Simultaneously, the measurement of the predetermined time tb (lapse to the write timing from point c in FIG. 5) is started in the write timing detector 162 (Step #14).

Subsequently, in the write frequency controller 163, the feed speed vw1 of the film F is calculated from the measurement result of the feed time tp, the initial write frequency fw1 and the second write frequency fw2 of film information are determined based on the calculation result, and these frequencies fw1, fw2 are set in the magnetic signal converter 17 (Step #16).

Thereafter, upon the completion of the measurement of the predetermined time tb (YES in Step #18, see time t3 of FIG. 6), the film information (binary data of a total bit number X) is inputted from the film information generator 161 to the magnetic signal converter 17. This film information is converted into a magnetic signal including a pulse train signal of the initial write frequency fw1 and outputted to the magnetic head 15. In this way, the writing of film information in the magnetic recordable area Fc of the N-th frame is started (Step #20).

Simultaneously, the write controller 165 starts counting the data number (bit number) of film information to be written in the magnetic recordable area Fc (Step #22). This can be done, for example, by measuring a recording time t after the start of the recording since a time tx (=1/fw1) required to output a bit of the magnetic signal from the magnetic signal converter 17 to the magnetic head 15 is known.

Thereafter, when the data number x of film information written in the magnetic recordable area Fc reaches the predetermined data number X1=(α1·X) (YES in Step #24, see time t4 of FIG. 6), the write frequency f of the magnetic signal is changed from fw1 to fw2 (=β1·fw1>fw1) in the magnetic signal converter 17 (Step #26), with the result that the film information is written in the magnetic recordable area Fc at a write frequency higher than at the start of the writing. When the data number x reaches the total data number X of film information (YES in Step #28, see time t5 of FIG. 6), the writing of film information is stopped (Step #30).

Subsequently, when the front edge (see point f of FIG. 5) of the perforation Fb2 at the rear end of the exposure area Fa of the N-th frame is detected from the third change in the detection signal of the photoreflector 14 (YES in Step #32, see time t6 of FIG. 6), a drive stop signal is outputted from the film feed controller 166 to the motor driver 18, thereby stopping the reverse rotation of the motor 9 (Step #34). In this way, the one frame winding is completed. The driving of the motor 9 may be stopped at the detection timing of the rear edge of the perforation Fb2.

As described above, in this embodiment, the feed speed vw1 of the film F is detected after the perforation Fb1 of the film F passes the photoreflector 14, and the initial write frequency fw1 of film information is determined based on this detection result. Accordingly, a suitable initial write frequency fw1 corresponding to the feed speed vw2 can be set when the feed speed vw2 of the film F varies at the start of the writing of film information.

As shown in the write frequency characteristic of FIG. 6, the write frequency fw is changed from the initial frequency fw1 to the second write frequency fw2 which is higher than fw1 during the recording of film information. Accordingly, the variation width ΔBb1 of the recording density of film information written in the magnetic recordable area Fc becomes smaller than the variation width ΔBb2 of the recording density in the case that the write frequency fw is not changed. Therefore, even if the feed speed v of the film F largely varies during the writing of film information, the film information can be recorded in the film F at a stable recording density.

Although the film information is written at two different write frequencies fw1, fw2 in the flowchart of FIGS. 7 and 8, it may be written at three or more different write frequencies fw1, fw2, fw3 and so on. In this case, since the degree of variation of the feed speed v of the film F is gradually reduced, rates of change β1, β2, β3, . . . of the write frequency fw may be made successively smaller (β1>β2>β3 . . . ) and numbers X1, X2, X3 . . . of data to be written at the respective write frequencies fw1, fw2, fw3, . . . may be successively made smaller.

Further, a rate of change during the writing of film information may be assumed based on the feed speed v of the film F at the start of the writing of film information and the number of times the write frequency fw is changed may be determined based on this assumption result. Alternatively, the number of times the write frequency fw is changed may be determined based on the total number X of film information.

Although the change timing of the write frequency fw is determined based on the number x of the data written at the initial write frequency fw1, it may be determined based on a feed time of the film F after the start of the feed of the film F (see point a of FIG. 5) or after the detection of the front or rear edge of the perforation Fb1 (see points b, c of FIG. 5).

Figure 9:
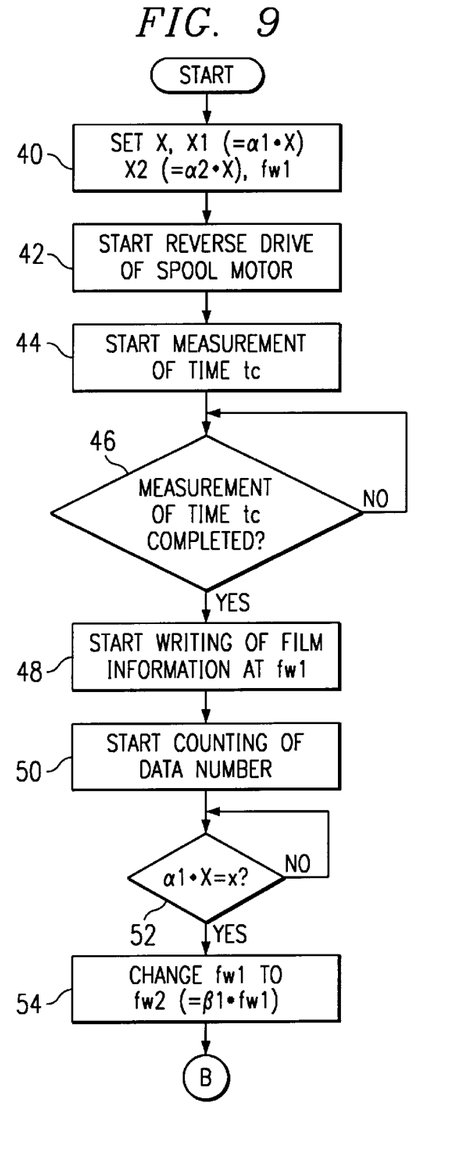
FIGS. 9 and 10 are a flowchart showing a second operation sequence of write control of film information.
Figure 10:
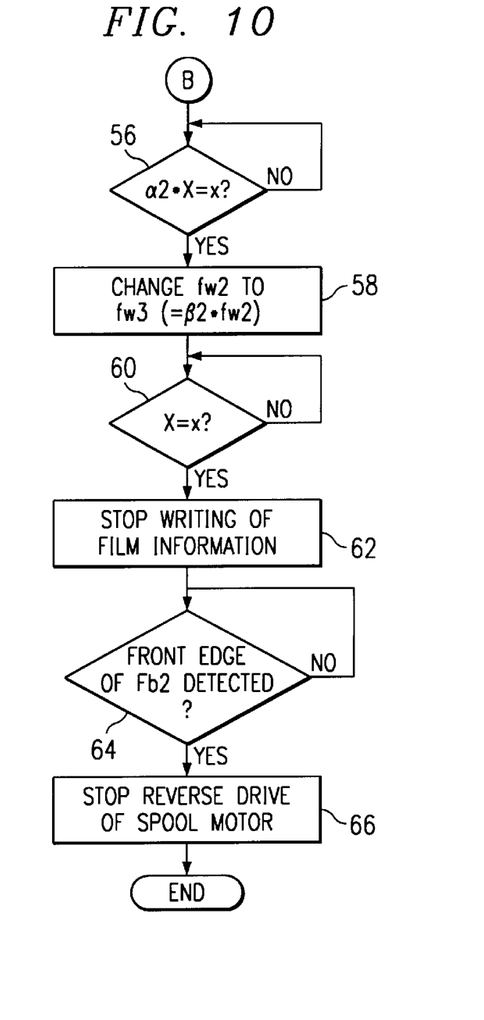

FIGS. 9 and 10 are a flowchart showing a second operation sequence of film information write control.

In the write control of the first operation sequence, the feed speed vw1 of the film F is detected immediately before the start of the writing of film information and the initial write frequency fw1 is determined based on this detected speed vw1. However, the feed speed vw1 of the film F is not detected and, instead, a predetermined initial write frequency fw1 is set in advance in the write control of the second operation sequence. Further, the writing of film information is started at the detection timing of the front or rear edge of the perforation Fb1, but at the start of the feed of the film F.

Accordingly, a block diagram of a control system of the film information recording device of the second operation sequence can be basically similar to that of FIG. 4. The write timing detector 162 starts measuring a time to a write start timing from the feed start timing of the film F. Further, the timer 163A of the write frequency controller 163 can be deleted. In this case, the write frequency controller 163 reads the predetermined initial write frequency fw1 from the memory 164 and set in the magnetic signal converter 17.

Since the feed speed vw1 of the film F is not detected in the write control of the second operation sequence, this write control is particularly effective in the case the feed speed vw1 of the film F immediately before the start of the writing of film information varies to a relatively small degree and has an advantage that the write control can be easily performed.

Although the film information is written at first, second and third write frequencies fw1, fw2, fw3 in the flowchart of FIGS. 9 and 10, the write frequency changing control is identical to the one in the case of the first operation sequence. Specifically, numbers X1 (=α1·X, 0<α1<1) and X2 (=α2·X, α1<α2<1, 0<(α1+α2)<1) of data to be written at the respective frequencies fw1 to fw3 are set in advance, and the write frequency fw is successively changed from the initial write frequency fw1 to the third write frequency fw3 each time the number x of the data written in the magnetic recordable area Fc reaches specified data numbers X1, X2 (Steps #50 to #62).

The operations performed in Step #50 and subsequent steps of the flowchart of FIGS. 9 and 10 are basically the same as those performed in Step #24 and subsequent steps of the flowchart of FIGS. 7 and 8. Accordingly, only Steps #40 to #48 are described here.

In FIG. 9, when an exposure to the N-th frame is completed, the write frequency controller 163 first sets the initial write frequency fw1 in the magnetic signal converter 17 and the data number X of film information corresponding to the exposed frame, the data number X1=α1·X of film information to be written at the initial write frequency fw1 and the data number X2=α2·X of film information to be written at the second write frequency fw2 are set in the write controller 165 (Step #40).

Subsequently, the motor 9 for driving the take-up spool 4 is driven in the reverse direction to start the winding of the film F and the write timing detector 162 starts measuring a predetermined time tc (a time to the write start timing from point a in FIG. 5) (Steps #44, #46).

Thereafter, when the measurement of the predetermined time tc is completed (YES in Step #46), the film information (binary data of a total bit number X) is inputted to the magnetic signal converter 17 from the film information generator 161; this film information is outputted to the magnetic head 15 after being converted into a magnetic signal including a pulse train signal of the initial write frequency fw1; and thereby the writing of film information in the magnetic recordable area Fc of the N-th frame is started (Step #48).

The first and second operation sequences do not consider a variation of the torque (i.e., the feed speed v of the film F) of the motor 9 resulting from a variation of a supply voltage and a variation of the wound amount of the film F. However, it is more preferable that the initial write frequency fw1, the rate of change of the write frequency fw, the change timing of the write frequency fw and the number of times the write frequency fw is changed be set in consideration of causes which vary the feed speed v so as to stabilize the recording density Bb of the recorded film information.

The rate of change of the write frequency fw is a rate of change before and after the change of the write frequency fw. For example, a rate of change of the write frequency fw between the initial write frequency fw1 and the second write frequency fw2 is a factor β1 since fw2=β1·fw1. Accordingly, the rates of change of the write frequency fw when the write frequency fw is changed from fw1, to fw2, fw3, . . . are factors β1, β2, β3, and so on.

As is clear from the variation characteristic of the feed speed v of the film F in FIG. 6, the acceleration of the feed speed v is monotonously reduced. Thus, it is desirable to monotonously decrease the rates of change β1, β2, β3, . . . of the write frequency fw even if the supply voltage is stable.

Figure 11A:
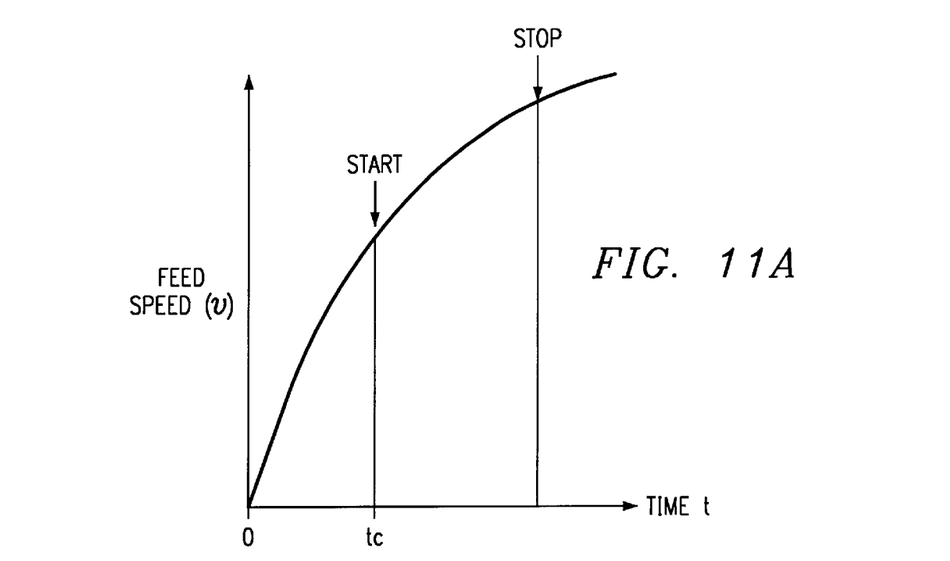
Figure 11B:
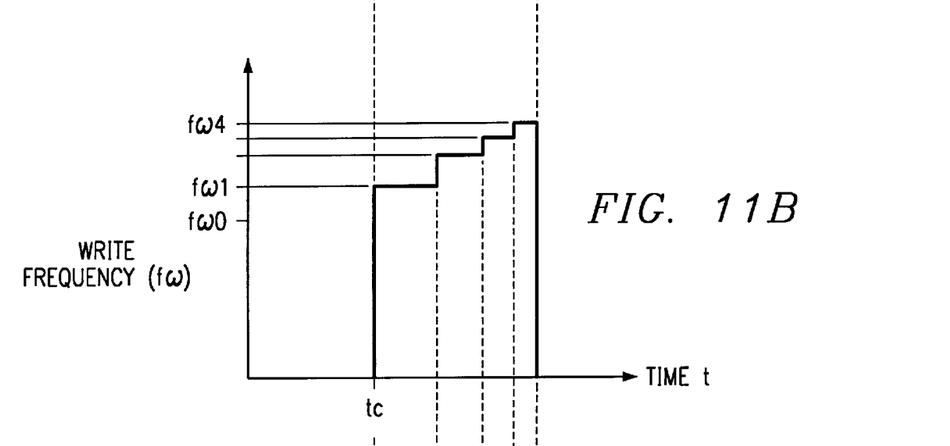
Figure 11C:
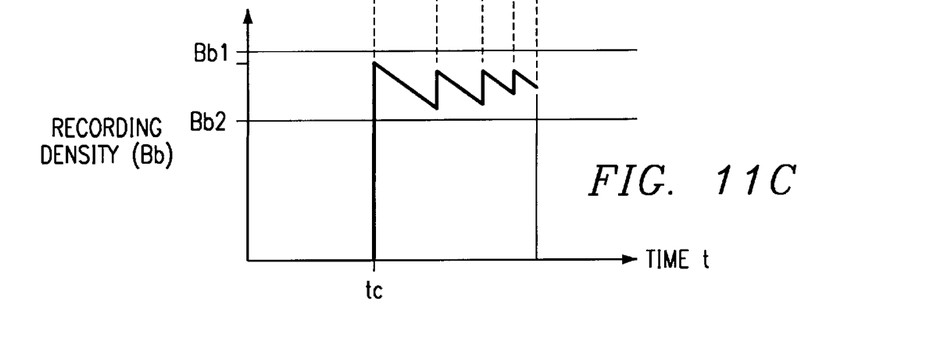

In the case of a high supply voltage (a new supply battery), the feed speed v of the film F during the one frame winding varies to a large degree and a maximum speed vmax is high as shown in FIG. 11 since the drive torque of the motor 9 is large. In the case that the supply battery is consumed and the supply voltage is lower than a standard drive voltage, the drive torque of the motor 9 is decreased, with the result that the feed speed v of the film F during the one frame winding varies to a smaller degree and the maximum speed vmax becomes lower.

Figure 12A:
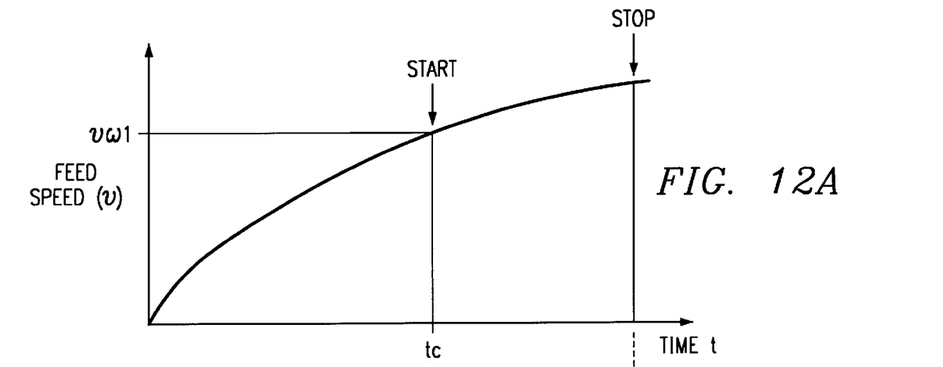
Figure 12B:
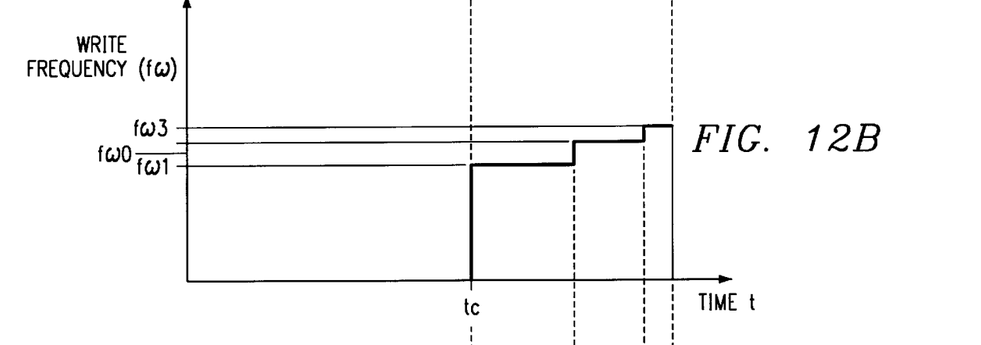
Figure 12C:
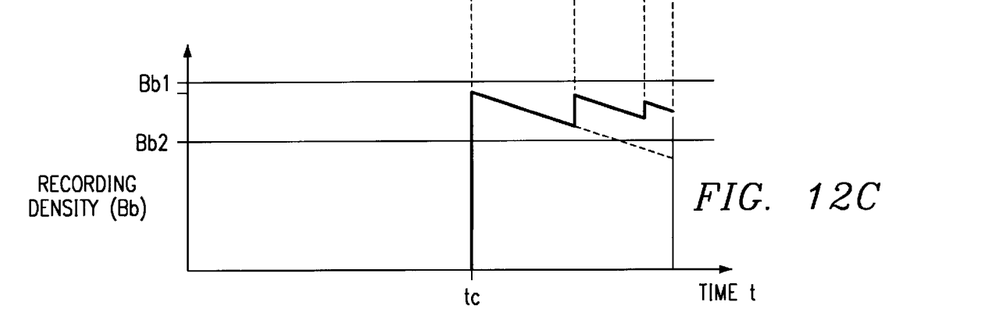

Accordingly, in the case that the supply voltage is lower than the standard drive voltage, the feed speed v of the film F at the start of the writing of film information is lower than the one when the supply voltage is at the standard level. Thus, as shown in FIG. 12, the recording density Bb of the film written in the film F may be made substantially the same by making the initial write frequency fw1 lower than an initial write frequency fw0 at the time of the standard voltage. In the case that the supply voltage is higher than the standard drive voltage, the recording density Bb of the film written in the film F may be made substantially the same by making the initial write frequency fw1 higher than the initial write frequency fw0 at the time of the standard voltage.

The rates of change β1, β2, β3, . . . of the write frequency fw are also made smaller than those at the time of the standard voltage since the feed speed v of the film F varies to a small degree, so that the variation width ΔBb of the recording density Bb can be substantially the same.

In the case of a high supply voltage, the write frequency fw is changed a relative large number of times, and the variation width ΔBb of the recording density Bb is suppressed by changing the recording density Bb bit by bit as shown in FIG. 11. On the other hand, in the case of a low supply voltage, the write frequency fw is changed a relatively small number of times to suppress unnecessary variation of the recording density Bb as shown in FIG. 12.

The control for setting the initial write frequency fw1 and the rate of change β of the write frequency fw in consideration of the supply voltage is considered to be performed, for example, according to the following method. As shown in phantom line of FIG. 4, a supply voltage detector 21 for detecting a voltage of a supply battery is provided and the initial write frequency fw1 and the rates of change β1, β2, β3, . . . of the write frequency fw are set and the change timings of the respective write frequency fw are set based on the voltage detected by the supply voltage detector 21.

In this case, the write frequency controller 163 may set the initial write frequency fw1 and the write frequency fw to be changed by the operational expression using a supply voltage value as a parameter. Alternatively, a plurality of initial write frequencies fw1 and the rate of changes β1, β2, β3, . . . of the write frequency fw may be stored in the memory 164 in correspondence with the supply voltages, and the write frequency controller 163 may set the initial write frequency fw1 and the write frequency fw to be changed are set by a conversion table stored in the memory 164 based on the voltage detected by the supply voltage detector 21.

Further, in consideration of a voltage variation of the supply battery resulting from a temperature variation, a temperature detector 22 for detecting an ambient temperature in the camera 1 may be provided instead of or in addition to the supply voltage detector 21. The initial write frequency fw1 and the rate of change β1, β2, β3, . . . of the write frequency fw may be set based on the temperature detected by this temperature detector 22.

An influence of the wound amount of the film F on the feed speed v of the film F is mainly related to a wound amount of the film F around the take-up spool 4.

Specifically, when the frames at the leading end of the film F are fed, the wound amount of the film F around the take-up spool 4 is small, and the diameter of the spool pulling the film F (the outer diameter of the outermost surface of the film F wound around the take-up spool 4) is small. Since the load to the motor 9 is small in this state, the revolving speeds of the motor 9 and of the spool 4 are high. Contrary to this, when the frames at the rear end of the film F are fed, the wound amount of the film F around the take-up spool 4 is large, and the diameter of the spool pulling the film F is large. Since the load to the motor 9 is large in this state, the revolving speeds of the motor 9 and of the spool 4 are low.

As described above, the diameter of the spool pulling the film F is small when the frames at the leading end of the film F are fed, whereas it is large when the frames at the rear end of the film F are fed. Thus, in the case of the same revolving speed of the spool 4, the film pulling speed is higher when the frames at the rear end of the film F are fed than when the frames at the leading end of the film F are fed.

Accordingly, by setting the initial write frequency fw1, the rates of change of the write frequency fw, the change timings of the write frequency fw and the number of times the write frequency fw is changed according to the number of exposures of the film F and the wound amount of the film F (wound frame number), the film information can be recorded at a plurality of suitable write frequencies fw corresponding to the feed speed v of the film F during the writing of film information similar to the case where the supply voltage varies.

The above argument concerns the stabilization of the recording density of film information. Since the variation of the feed speed v of the film F at the start of the feed fairly influences the write starting position of film information in the magnetic recordable area Fc since the writing of film information is started at the write start timing (feed time) tb or tc from the reference point.

If the write start timing (feed time) tb or tc is fixed regardless of the variation of the supply voltage and the variation of the drive torque of the motor 9 resulting from the varying wound amount of the film F, the magnetic head 15 may start writing the film information before the magnetic recordable area Fc is reached if, for example, the feed speed v of the film f at the start of the feeding becomes slower due to the low drive torque of the motor 9 in relation to the load. Conversely, if the feed speed v of the film F at the start of the feed becomes faster due to the high drive torque of the motor 9 in relation to the load, the magnetic head 15 may not start writing the film information even after the magnetic recordable area Fc is reached.

Accordingly, it is preferable to change the write start timings (feed time) tb or tc from the reference point according to the variation of the supply voltage and the variation of the drive torque of the motor 9 resulting from the varying wound amount of the film F. Particularly, since the write start timing tc in the write control of the second operation sequence comes later than the write start timing in the write control of the first operation sequence, the write start timing is preferably changed according to the variation of the drive torque of the motor 9.

For example, the write control of the second operation sequence may be, in response to the variation of the supply voltage, such that the write start timing tc comes earlier when the supply voltage is high as shown in FIG. 11, and the write start timing tb comes later when the supply voltage is low as shown in FIG. 12. Further, the initial write frequency fw1 and the rate of change β of write frequency fw may be made smaller when the supply voltage is low than when the supply voltage is high.

Although the film information recording device for a camera is described in the foregoing embodiment, the prevent invention is not limited to its application to a camera. For example, the present invention may be applied to a film information recording device of a film information reproducing apparatus for reproducing photographed images recorded in a developed film contained in a cartridge on a display device such as a CRT (Cathode Ray Tube).

As described above, information corresponding to an exposed frame is converted into a recording signal obtained by modulating a pulse train signal of a predetermined initial write frequency. A recorder is caused to relatively scan the information recordable area corresponding to the exposed frame while the film is wound after the completion of the photographing so as to record the recording signal in this information recordable area. The write frequency of the recording signal is changed at least once during the recording. Accordingly, even if the feed speed of the film largely changes during the winding of the film, the recording density of the magnetic signal recorded in the information recordable area varies within a suppressed range. Therefore, the information can be recorded at the stable recording density.

Further, the feed speed of the film is detected from the detection signal of the perforation of the film while the film is wound after the completion of the photographing. The initial write frequency is set based on this film feed speed. The information corresponding to the exposed frame is converted into the recording signal obtained by modulating the pulse train signal of this initial write frequency. Accordingly, the variation center of the recording density of the magnetic signal recorded in the information recordable area can be stabilized regardless of the variation of the film feed speed, and the information can be recorded at a more stable recording density.

Furthermore, since the write frequency after the change is higher than the one before the change, the variation width of the recording density of the information concerning the photography which is recorded in the magnetic recordable area can be suppressed even in the case that the winding speed of the rolled film is increased. Further, since the number of times the write frequency is changed is set based on the total number of pieces of information concerning the photography, the variation width of the recording density of the information concerning the photography which is recorded in the magnetic recordable area can be suppressed by increasing the number of changing times even in the case that the total number of pieces of information is large.

Further, since the recording of the information concerning the photography is started at the specified write start timing after the start of the winding of the rolled film or the detection of the perforation of the rolled film, the recording start position of the information in the magnetic recordable area can be stabilized by a simple control.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus for recording film information on a film, comprising:

a film feeder which feeds the film, said film having a plurality of film exposure areas, each of said film exposure areas having a corresponding recordable area, said film feeder incrementally feeding said film by one exposure area;

a recording device which records film information for each of said film exposure areas on said corresponding recordable area, said recording device recording said information at a signal frequency, said film information for each film exposure area including a plurality of segments of data in a specified order; and a frequency controller which changes the signal frequency from a first frequency to a second frequency during the time when the film information corresponding to one of said exposure areas is being recorded on the recordable area;

wherein said frequency controller changes the signal frequency after a portion of said film information has been recorded, an amount of said portion of said film information being independent of partitions between said plurality of segments of data in said film information.

2. An apparatus for recording in accordance with claim 1, wherein the recording member performs magnetic recording.

3. An apparatus for recording in accordance with claim 1, further comprising:

a write controller;

wherein the frequency controller, in response to the write controller, changes the signal frequency from the first frequency to the second frequency, said write controller instructing the change in the signal frequency after a predetermined quantity of said information is recorded on the recordable area at the first frequency.

4. An apparatus for recording in accordance with claim 1, further comprising:

a write controller;

wherein the frequency controller, in response to the write controller, changes the frequency of the signal from the first frequency to the second frequency after elapse of a predetermined time from a start of feeding the film.

5. An apparatus for recording in accordance with claim 1, further comprising:

a perforation detecting device;

wherein the film is formed with perforations at specified positions and the frequency controller, in response to the perforation detecting device, changes the frequency of the signal from the first frequency to the second frequency after elapse of a predetermined time from a detection of a perforation.

6. An apparatus for recording in accordance with claim 1, wherein the second frequency is higher than the first frequency.

7. An apparatus for recording in accordance with claim 1, further comprising:

a voltage detector;

wherein the film feeder includes an electric driver, said voltage detector detects a voltage of the electric driver, and the frequency controller sets the first and second frequencies in accordance with the detected voltage of the electric driver.

8. An apparatus for recording in accordance with claim 1, further comprising:

a temperature detector which detects an ambient temperature of the film feeder;

wherein the frequency controller sets the first and second frequencies in accordance with a detected temperature.

9. An apparatus for recording in accordance with claim 1, wherein said write controller includes a counter for counting a number of exposure areas already passed a specified position, and wherein the frequency controller sets the first and second frequencies in accordance with a count by the counter.

10. An apparatus for recording in accordance with claim 1, wherein said film information is recorded at the first frequency for a first portion of said recordable area and said film information is recorded at the second frequency for a second portion of said recordable area, the second portion being larger than the first portion.

11. An apparatus for recording film information on a film, comprising:

a film feeder for feeding the film, said film having a plurality of film exposure areas, each of said film exposure areas having a corresponding recordable area, said film feeder incrementally feeding said film by one exposure area;

a recording signal generator for generating for each exposure area a recording signal based on a given film information, said film information for each film exposure area including a plurality of segments of data, the recording signal being generated by modulating a pulse train signal in accordance with the given film information, said pulse train signal having a pulse frequency;

a recording device for recording for each exposure area the generated recording signal on the recordable area corresponding to the exposure area while the film is being fed; and a frequency changer for changing the pulse frequency of the generated recording signal at least once during a time when the recording signal is being recorded to one of said recordable areas;

wherein said frequency controller changes the pulse frequency after a portion of said film information has been recorded to said one of said recordable areas, an amount of said portion of said film information being independent of partitions between said plurality of segments of data in said film information.

12. An apparatus for recording in accordance with claim 11, wherein the film is formed with perforations at specified positions, each perforation having a predetermined size, further comprising:

a perforation detector which detects a perforation;

a time detector which detects a period of time when the perforation is being detected by the perforation detector;

a feed speed calculator which calculates a feed speed of the film based on a detected period of time and the predetermined size of the perforation; and an initial frequency setter which sets, based on a calculated feed speed, an initial frequency for a recording signal to be generated by the recording signal generator.

13. An apparatus for recording in accordance with claim 11, wherein the frequency of the recording signal changed by the frequency changer is higher than the frequency of the recording signal before changed.

14. An apparatus for recording in accordance with claim 11, wherein the frequency changer includes a change number setter which sets a number of frequency changes for the recording signal in accordance with a total number of bits of data in the pulse train signal corresponding to the given film information.

15. An apparatus for recording in accordance with claim 11, further comprising a time detector which detects an elapse of a predetermined time after a start of feeding the film, wherein the recording member starts the recording of the recording signal on the recordable area when the elapse of the predetermined time is detected by the time detector.

16. An apparatus for recording in accordance with claim 11, wherein the film includes perforations at specified positions, further comprising:

a perforation detector which detects a perforation; and a time detector which detects an elapse of a predetermined time after detection of the perforation;

wherein the recording device starts the recording of the recording signal on the recordable area when the elapse of the predetermined time is detected by the time detector.

17. A method for recording film information on a film having a plurality of exposure areas and a plurality of corresponding recordable areas comprising the steps of:

feeding the film by one exposure area;

during a portion of a time that the film is being fed, generating a signal corresponding the film information to be recorded;

recording a first portion of the signal on a first portion of the recordable area, said recording on the first portion of the recordable area being performed at a first frequency;

changing the recording frequency from the first frequency to a second frequency after the recording on the first portion is completed; and recording a second portion of the signal on a second portion of the recordable area, said recording on the second portion of the recordable area being performed at a second frequency;

wherein the film information for each film exposure area includes a plurality of segments of data and an amount of said first portion of the signal is independent of partitions between said plurality of segments of data in the film information.

18. An apparatus for recording information on a film which comprises:

a film feeder for feeding said film, said film having a plurality of film exposure areas, each of said film exposure areas having a corresponding information recordable area, said film feeder incrementally feeding said film by one exposure area at a time;

a signal generating device which generates a signal corresponding to said information for each film exposure area, said information for each film exposure area including a plurality of segments of data, said generated signal for each film exposure area being a serial bit stream;

a recording device which records the serial bit stream for each film exposure area on the corresponding recordable area on the film, said serial bit stream being recorded by said recorder at a bit frequency;

a write controller which controls a starting timing and a frequency changing timing of said recording device; and a frequency controller, responsive to said write controller, which changes the recording bit frequency during the time when the serial bit stream is being recorded on the recordable area;

wherein said frequency controller changes the recording bit frequency after a portion of the serial bit stream has been recorded, an amount of said portion of said serial bit stream being independent of partitions between said plurality of segments of data in said film information.

19. An apparatus for recording in accordance with claim 18, wherein said serial bit stream includes a plurality of data bits, an amount of said plurality of data bits being related to an amount of said portion of said serial bit stream by:

$$X1 = \alpha1 \cdot X$$

where,

X equals said amount of said plurality of data bits,

X1 equals said amount of said portion of said serial bit stream, and $0 < \alpha1 < 1$.

20. An apparatus for recording in accordance with claim 19, wherein said signal generating device, said recording device, said write controller, and said frequency controller are cooperatively adapted to record an amount of said plurality of data bits which varies between exposure areas.

21. An apparatus for recording in accordance with claim 18, wherein said film feeder feeds said film at a nonuniform film transport velocity and wherein said frequency controller changes the recording bit frequency a plurality of times during the time when the serial bit stream is being recorded on the recordable area so that a recorded bit spatial density is maintained within a predetermined range.

* * * * *